United States Patent [19]

Suzuki

[11] Patent Number: 5,375,108
[45] Date of Patent: Dec. 20, 1994

[54] OPTICAL DISK DEVICE AND METHOD FOR CONTROLLING HEAD MOVEMENT THEREOF

[75] Inventor: Haruyuki Suzuki, Yokohama, Japan

[73] Assignee: Ricoh Company, Ltd., Tokyo, Japan

[21] Appl. No.: 135,328

[22] Filed: Oct. 12, 1993

Related U.S. Application Data

[63] Continuation of Ser. No. 869,335, Apr. 15, 1992, abandoned.

[30] Foreign Application Priority Data

Apr. 20, 1991 [JP] Japan ................................. 3-116818

[51] Int. Cl.$^5$ ............................................. G11B 7/09
[52] U.S. Cl. ............................ 369/44.28; 369/44.25; 369/44.34; 369/44.35; 369/51
[58] Field of Search ............... 369/44.78, 44.29, 44.27, 369/44.32, 44.34, 44.35, 44.36, 44.25, 44.26, 53, 50, 54, 58; 360/78.05, 78.06, 78.07, 78.08

[56] References Cited

U.S. PATENT DOCUMENTS

| | | | |
|---|---|---|---|
| 4,813,031 | 3/1989 | Bierhoff | 369/50 |
| 4,942,563 | 7/1990 | Yamamuro | 369/44.34 |
| 5,023,733 | 6/1991 | Koga et al. | 360/77.04 |
| 5,047,999 | 9/1991 | van der Meulen | 369/58 |
| 5,072,436 | 12/1991 | Honda | 369/112 |
| 5,084,849 | 1/1992 | Ishii et al. | 369/44.35 |
| 5,097,458 | 3/1992 | Suzuki | 369/44.34 |
| 5,144,617 | 9/1992 | Gotoh et al. | 369/112 |
| 5,157,645 | 10/1992 | Takahara et al. | 369/44.28 |

FOREIGN PATENT DOCUMENTS 63-502627 9/1988 Japan ............................. G11B 7/00

OTHER PUBLICATIONS

Kazuhisa Koumura, et al., "High Speed Accessing By Direct Accessing", Proc. Int. Symp. on Optical Memory, 1989, Japanese Journal of Applied Physics, vol. 28 (1989) Supplement 28-3, pp. 73-76.

*Primary Examiner*—Aristotelis Psitos
*Assistant Examiner*—Mohammad N. Edun
*Attorney, Agent, or Firm*—Cooper & Dunham

[57] ABSTRACT

An optical disk device having a head for reading information from a disk having tracks of different pitches depending upon a radial position on the disk. The device comprises: a unit for detecting the number of track where the head is being located from a reading signal of the optical disk; a unit for calculating the track pitch at the present time from the track number; a unit for detecting the relative velocity of the optical disk with respect to the track from the reading signal; a unit for detecting the velocity of the optical head at the present time by multiplying the relative velocity to the track pitch at the present time; and a unit for calculating the reference velocity in such a way that an object track number data is transformed to a data based on radius of the disk, that the track number data at the present time is transformed to a data based on radius of the disk and that the length between the object track and the track at the present time is calculated by subtracting the transformed track number data from the transformed object track number data.

4 Claims, 2 Drawing Sheets

OPTICAL DISK DEVICE AND METHOD FOR CONTROLLING HEAD MOVEMENT THEREOF

This is a continuation of U.S. patent application Ser. No. 07/869,335 filed Apr. 15, 1992, now abandoned.

BACKGROUND OF THE INVENTION

1. Field of the Invention

The present invention relates to an optical disk device and a method for controlling the movement of the read/write head of the device which is applied to an optical information read/write device which functions to record, regenerate and erase information data with the use of a minute spot formed on an optical information recording medium such as an optical disk. More particularly, the present invention relates to an optical disk device and a method for controlling the head movement thereof in which the time for movement of the head is unchanged and the loop gain of the velocity data is also unchanged irrespective of change of the track pitch according to the radial position of the head on the optical disk.

2. Description of the Related Art

In accordance with an optical information read/write device such as an optical disk device, the position of the optical beam spot irradiated on the optical disk is detected in such a way that by counting the tracking error signal obtained each time when the optical beam traverses a track on the disk, the track number is measured and that the position of the optical beam, i.e., the position of the optical head is determined on the basis of the number of the tracks.

The tracking error signal is also used for controlling the velocity of the optical beam movement in such a way that the optical beam speed is detected from the tracking error signal and compared to a reference velocity data so as to control the head motion speed.

That is, the tracks formed on the optical disk are used as a scale means for detecting the position of the optical head now on being located and the velocity thereof.

Therefore, the unit of the detected velocity is arranged as (track/sec) which means the number of tracks traversed by the head in a unit of time.

In general, the unit of velocity is represented by (m/sec). That is, with respect to the process for detecting the velocity of the optical head mentioned above, the track pitch Tp (m/track) is inevitably used to obtain the head velocity.

On the other hand, to increase the memory capacity of the disk, an arrangement of a memory means is proposed wherein the track pitch is narrowed along the radial direction from the inner side of the disk toward the outer side thereof.

In accordance with such a pitch varying arrangement wherein the track pitch Tp varies as a function of the radial position thereof on the disk, the actual velocity of the optical head (represented with the use of unit m/sec) in relation to the reference velocity (unit m/sec) is controlled so that the head speed become fast in the inner side area of the disk since the track pitch Tp is large in that area, while the head speed becomes slow in the outer side periphery area of the disk since the track pitch Tp is small in that area.

On the other hand, the maximum value of the drive current for driving the optical head to move is limited for each device. Therefore, it is necessary to arrange the reference velocity value on the basis of the track pitch Tp of inner side area of the disk where a large actual velocity is required.

Accordingly, from the view of average velocity, the optical head moves at a slower speed than the speed of the head moving in the innermost side area of the disk, as a result of which the average time for moving from one track to another track becomes long in comparison to the time for the disk having a regular track pitch.

Besides, the track pitch data is input to the loop of the velocity control system, which results in that the loop gain is changed according as the track pitch Tp changes along with the movement of the optical head.

As mentioned above, in accordance with the disk device having an arrangement wherein the track pitch is narrowed from the inner side to the outer periphery side of the disk to increase the memory capacity of the disk, there are drawbacks that the average moving time of the optical head from one track to another becomes long in comparison to the disk having tracks arranged at a regular pitch since the reference velocity for controlling the actual speed of the head is determined on the basis of the track pitch Tpof the inner side area of the disk where the head has to move at a high speed and that the loop gain is varied when the pitch Tp is changed according as the optical head moves on the disk.

SUMMARY OF THE INVENTION

It is therefore an object of the present invention to provide an optical disk device and a method for controlling the head thereof wherein the above mentioned problems involved in the track pitch varying disk device can be obviated, that is, the problems that the average moving time of the optical head becomes long in comparison to the regular track pitch disk device and that the loop gain is changed according as the change of the track pitch are obviated sothat the head is controlled to move on the disk without elongating the shifting time of the head and changing the loop gain value.

The above mentioned object of the present invention can be achieved by an optical disk device having an optical head for readinginformation from an optical disk which has recording tracks formed thereon with different pitches which vary depending upon a radial position on the disk, the device comprising:

a track number detection unit for detecting the track number of the track where the optical head is being located at the present time from a reading signal obtained from the optical disk;

a track pitch calculation unit for calculating the track pitch at the present time from the track numberat the present time;

a relative velocity detection unit for detecting the relative velocity of the optical disk with respect to the track from the reading signal obtained from the optical disk;

an actual velocity detection unit for detecting the velocity of the optical head at the present time by multiplying the relative velocity to the track pitch atthe present time; and a reference velocity calculation unit for calculating the reference velocity in such a way that an object track number data is transformed to a data based on radius of the disk, that the track number data at the present time is transformed to a data based on radius of the disk and that remaining difference of distance between the object track and the track at the present time is calculated by subtracting the transformed track number data at the present time from the transformed object track number data so as to obtain the reference velocity from the calculation result of the remaining difference of distance, the reference velocity being used for controlling movement of the optical head.

In accordance with the method for controlling the optical head of the present invention, wherein the track pitch changes with respect to the radius of the disk (radial position on the disk) in accordance with a constant linear relation, the velocity of the head shifting movement is controlled on the basis of the reference velocity which is independent from the track pitch and the detection data of the actual velocity of the head.

In accordance with the present invention, the velocity data of the head shifting movement is obtained in such a way that from the reading signal obtained from the disk, the identical number of track on which the head is being now located and the relative head velocity in relation to the track are detected and that the track pitch at the position of the head is obtained from the detected track number so that the velocity of the head shifting movement is calculated by multiplying the above mentioned relative head velocity to the track pitch obtained from the track number.

It is therefore an advantage of the present invention that it becomes possible to reliably control the actual velocity of the head irrespective of the track pitch so that the average time for shifting motion of the head is shortened.

It is another advantage of the present invention that since the average time for shifting motion of the head is kept short as the case of the regular track pitch arrangement, the loop gain of the control system is not changed so that the shifting movement of the head can be stably controlled.

Further objects and advantages of the present invention will be apparent from the following description of the preferred embodiments of the invention as illustrated in the accompanying drawings.

DESCRIPTION OF THE PREFERRED EMBODIMENTS

Figure 1:
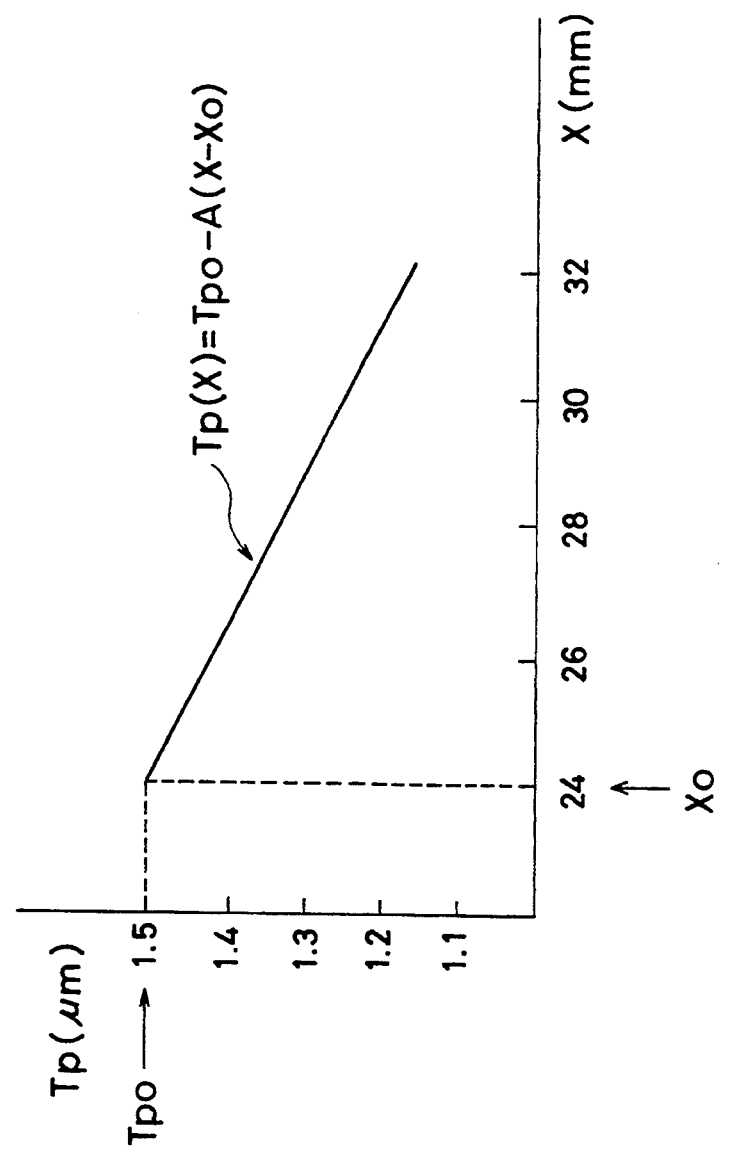
FIG. 1 is a graphical view representing the change of the track pitch with respect to the radius of the disk.

FIG. 1 illustrates an example of the track pitch changing state in relation to the disk radius. In the drawing, the abscissa represents radius of the disk (radial position on the disk) and the ordinate represents the track pitch Tp.

The present invention is applied to the optical disk device wherein the track pitch changes along the radial direction of the disk as represented by the exemplified graph of FIG. 1.

At the position of radius X0 (24 mm for instance), the track pitch is Tp0 (2.4 μm for instance). From the position of radius X0, the track pitch Tp-decreases without fluctuation according as the radius X increases.

In the case where the track pitch Tp decreases linearly as illustrated in FIG. 1, the change of the pitch can be represented by a function Tp(X) which is a function of radius X as follows.

$$Tp(X) = Tp0 - A(X - X0) \tag{1}$$

wherein the letter A is a constant number.

The function to represent the change of track pitch is not limited to the formula (1) described above. Any formula can be adopted to represent the track pitch change which decreases linearly or curvingly without fluctuation with respect to the radius X. In this particular embodiment of the present invention, the formula of the track pitch change is exemplified by the above mentioned formula (1).

Also, assuming that the number of tracks included in a range from the radius X0 to a certain radius X is defined as track number N(X), the track number N(X) can be represented by the following formula (2).

$$N(X) = \int_{X0}^{X} \frac{dX}{Tp(X)} \tag{2}$$

On the other hand, in the case where the track pitch is arranged to be constant as Tp0 irrespective of the radius, the track number N(X) is represented by the following equation (3).

$$N(X) = \frac{X - X0}{Tp0} \tag{3}$$

In this particular embodiment of the present invention here, the track pitch changes according as the radius changes. Therefore, the track number N(X) is obtained from the equations (1) and (2).

By substituting Tp(X) of the equation (1) for the Tp(X) of the equation (2), the track number N(X) can be represented by the following equation (4).

$$N(X) = \frac{1}{A} \log \frac{Tp0}{Tp0 - A(X - X0)} \tag{4}$$

As can be seen from the equation (4), the track number N(X) can be obtained from the number of tracks included in a range from a position of radius X0 to another position of radius X and a track pitch at the position of radius X0.

On the other hand, if the track number N is known, the relation between the track pitch Tp(N) at the position of the track number N and the radius X(N) at the position of the track number N can be represented by the following equation (5) on the basis of the above mentioned equations (1) and (4).

$$Tp(N) = \frac{Tp0}{EXP(AN)} \tag{5}$$

The equation (5) can be transformed to the following equation (6).

$$X(N) = \frac{1}{A} [1 - Tp(N)] + X0 \tag{6}$$

In accordance with the present invention, the velocity of the optical head shifting movement is controlled on the basis of the equation (6) which means that the radius X(N) at the track number N can be obtained from the track pitch Tp(N) at the track number N and the radius X0 so that the head speed is controlled with the use of the reference velocity Vr which is independent from the track pitch Tp and the detected actual velocity Vd.

The optical disk device and the method for controlling the head thereof in accordance with the present invention are further described in detail below with reference to FIG. 2.

Figure 2:
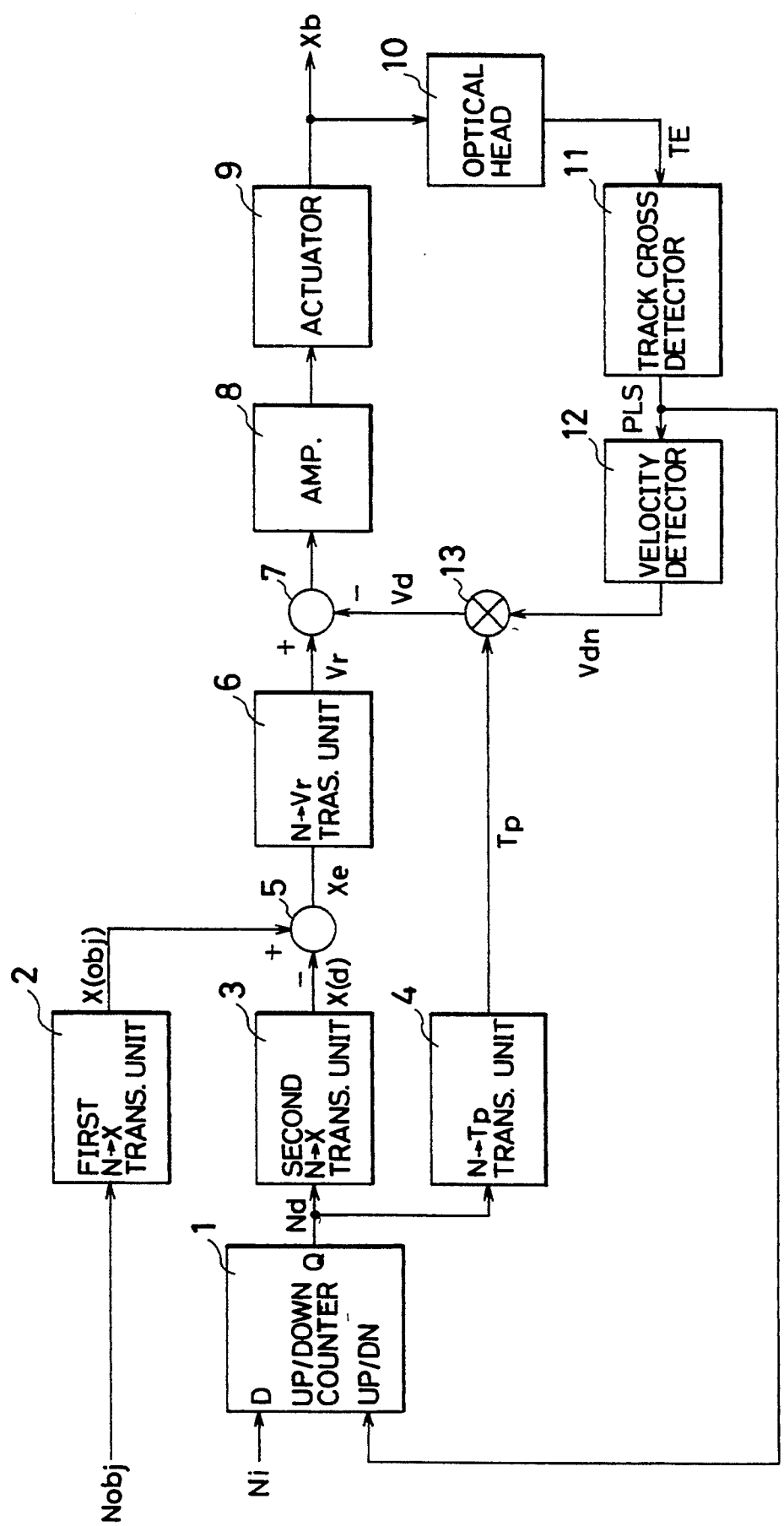
FIG. 2 is a block diagram of a main portion of the head shifting movement speed controlling means of the optical disk device in accordance with an embodiment of the present invention.

FIG. 2 illustrates a block diagram of a main portion of the optical head shifting movement controlling means of the optical disk device in accordance with an embodiment of the present invention.

In the drawing is represented a circuit structure which comprises an up-down counter 1, a first N-to-X converter 2, a second N-to-X converter 3, an N-to-Tp converter 4, a subtracter 5, an X-to-Vr converter 6, a comparator 7, an amplifier 8, an actuator 9, an optical head 10, a track cross detector unit 11, a velocity detector unit 12, and a multiplier 13.

Also, the letters represented in FIG. 2 are defined as follows, respectively.

The letter Nobj designates an object track number, the letter X(obj) designates an object track number whichis transformed to a formula on the basis of radius, the letter Ni designates a track number immediately before the time when the head shifting motion is started, the letter Nd designates the output from the counter which represents the track number of the position at which the head is now being located, the letter Xb designates a radial position of the optical head 10 on the disk, the letter Vdn designates a relative velocity of the optical head 10 with respect to the disk, the letter Vd designates an actual velocity of the optical head 10, the letter X(d) designates an actual velocity of the head 10 which is transformed to a formula on the basis of radius, the letter Xe designates remaining difference of distance between the entire length to be moved and the length which has been moved yet, the letter Vr designates a reference velocity, the letter TE designates a track error signal, and the letter PLS designates a track cross pulse signal.

In FIG. 2, first, the object track number Nobj is indicated from a host computer which is not shown.

Also, the track number Ni immediately before the time when the seek motion is started is detected by a track number detection means (not shown) and input and loaded to the counter 1.

The optical head 10 comprises a reading means which detects the transverse motion of the head 10 at the time when the head transverses a track on the disk (not shown) and outputs the detection signal as a track error signal TE.

The track error signal TE is transformed to the track pulse signal PLS by the track cross detection means 11 in such a way that two pulses are generated each time when the head crosses one track, for instance.

The counter 1 counts up or counts down upon receipt of the pulse signal PLS output from the track cross detection means 11 according to the direction of the movement of the head, that is, whether the head is moving from the outer side of the disk to the inner side thereof or vice versa.

As a result, the counter output Nd designates the track number of the position at which the head 10 is now being traversing.

Also, the track pulse signal PLS is transmitted to the velocity detection means 12 which detects the relative velocity Vdn of the optical head 10 with respect to the track.

It is to be noted that the detection means for detecting the track number Nd on which the head is now being located and the detection means for detecting the relative velocity Vdn are known themselves per ce and that any means or variants thereof can be used as the detection means mentioned above instead.

It is also robe noted that the relative velocity Vdn of the head 10 with respect to the track is detected on the basis of the track pitch Tp at the position where the head is now being located and represented by the unit of (track/sec).

The relative velocity Vdn is multiplied to the track pitch Tp at the position where the head 10 is now being located by the multiplying means—so that the actual velocity Vd (m/sec) can be calculated.

On the other hand, the track pitch at the position where the head is now being located can be obtained from the track number Nd of the track on which the head is now being positioned by transforming the equation (5). The equation (5) is transformed by the N-to-Tp transforming unit 4.

Also, the object track number Nobj and the track number Nd at present time, respectively, are transformed to the data X(obj) and X(d) represented as formulas on the basis of radius by the first N-to-X transformer unit 21 and the second N-to-X transformer unit 3, respectively, on the basis of the equation (6).

By subtracting the transformed data X(d) from the transformed data X(obj), it becomes possible to obtain the remaining difference Xe of the distance between the length to be sought and the length which has been sought yet.

The remaining distance data Xe is input to the X-to-Vr transformer unit 6 which transforms the data Xe to the reference velocity Vr (m/sec) at the radius X corresponding to the position of the remaining distance Xe.

The X-to-Vr transformer unit 6 is preferably arranged onthe basis of the following equation (7) but not limited to the equation.

$$Vr = K(Xe)^{\frac{1}{2}} \quad (7)$$

wherein the letter K represents a constant number.

In accordance with the process as mentioned above, it becomes possible to calculate and obtain the reference velocity Vr which is independent from the track pitch Tp and the actual detected velocity Vd.

Accordingly, it becomes possible to control the actual velocity of the optical head 10 irrespective of the change of the track pitch.

For instance, in accordance with the seeking motion control arrangement of FIG. 2, the comparator 7 compares the detected velocity data Vd to the reference velocity data Vr and outputs the comparison result to the amplifier 8 which amplifies the result so that the actuator 9 assembled integrally within the optical head 10 as one unit is driven on the basis of the amplified comparison result.

It is to be noted that the output from the actuator 9 is the signal Xb which represents the radial position of the optical head 10 on the disk.

It is also to be noted that various variants of equations can be used in response to the changing manner of the track pitch Tp for constituting the transformer units 2, 3 and 4.

Many widely different embodiments of the present invention maybe constructed without departing from the spirit and scope of the present invention. It should be understood that the present invention is not limited to the specific embodiments described in the specification, except as defined in the appended claims.

What is claimed is:

1. An optical disk device for controlling movement of an optical head in a radial direction traversing recording tracks on an optical disk in which a track pitch of the recording tracks varies according to a radial position thereof, said device comprising:

a track number detector for detecting a track number of a track on which said optical head is presently located by counting a track cross signal generated whenever the optical head traverses a track on the optical disk;

a track pitch calculation for calculating a track pitch of said track on which said optical head is presently located from said detected track number on the basis of a predetermined relation between a radius of the optical disk and the track pitch;

a relative velocity detector for detecting a relative velocity of said optical head with respect to said track from said reproducing signal;

an actual velocity detector for detecting an actual velocity of said optical head by multiplying said detected relative velocity and said calculated track pitch, said actual velocity being independent of said track pitch;

a reference velocity calculation circuit for transforming said track number, on the basis of the predetermined relation between the radius of the optical disk and the track pitch, to a value corresponding to a distance from a center of said optical disk to said track and transforming an object track number on an object track, on the basis of the predetermined relation between the radius of the optical disk and the track pitch, to an another value corresponding to a distance from the center of said optical disk to said object track, and for calculating a remaining difference of distance between said track and said object track from a difference between said transformed value and said transformed another value, and for calculating a reference velocity in response to said calculated remaining difference of distance, said object track being predetermined for defining an object position on said optical disk;

a comparator for comparing said actual velocity with said reference velocity; and an actuator for driving said optical head in response to a comparison result of said actual velocity and said reference velocity.

2. An optical disk device according to claim 1, wherein said track pitch of the recording tracks varies linearly according to the radius of said optical disk.

3. A method for controlling movement of an optical head of an optical disk device in a radial direction traversing recording tracks on an optical disk in which a track pitch of the recording tracks varies according to a radial position thereof, said method comprising steps of:

detecting a track number of a track on which said optical head is presently located, by counting a track cross signal generated whenever the optical head traverses a track on the optical disk;

calculating a track pitch of said track from said detected track number on the basis of a predetermined relation between a radius of the optical disk and the track pitch;

detecting a relative velocity of said optical head with respect to said track from said reproducing signal;

detecting an actual velocity of said optical head by multiplying said detected relative velocity to said calculated track pitch said actual velocity being independent of said track pitch;

transforming said track number, on the basis of the predetermined relation between the radius of the optical disk and the track pitch, to a value corresponding to a distance from a center of said optical disk to said track;

transforming an object track number of an object track, on the basis of the predetermined relation between the radius of the optical disk and the track pitch, to another value corresponding to a distance from the center of said optical disk to said object track, said object track being predetermined for defining an object position on said optical disk;

calculating a remaining difference of distance between said track and said object track from a difference between said transformed value and said transformed another value;

calculating a reference velocity in response to said calculated remaining difference of distance;

comparing said actual velocity with said reference velocity; and controlling said optical head in response to a comparison result of said actual velocity and said reference velocity.

4. A method according to claim 3, wherein said relative velocity is represented by units of (track/time) and said track pitch is represented by units of (length/track) so that said actual velocity represented by units of (length/time) irrespective of said track pitch can be obtained by multiplying said relative velocity and said track pitch.

* * * * *